HALL & PIERCE.
Hay Loader.
No. 43,307.
Patented June 28, 1864.
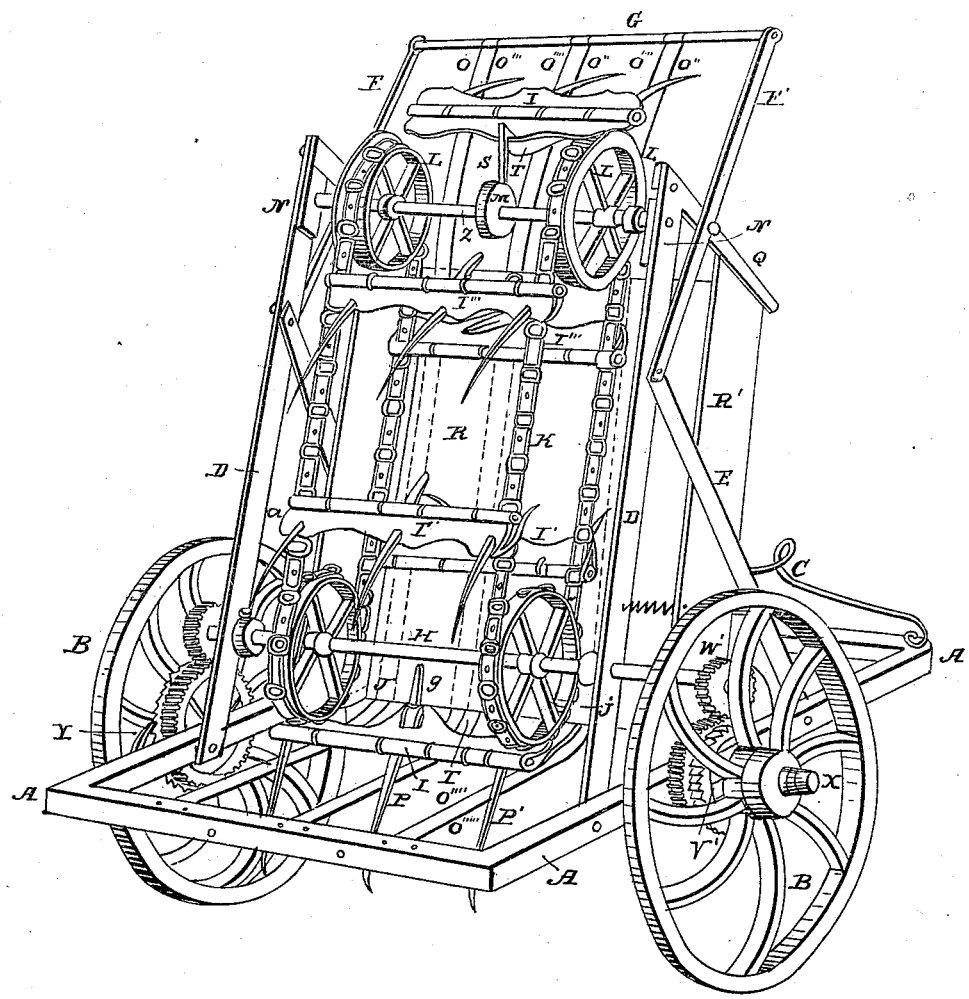

UNITED STATES PATENT OFFICE.

JAMES T. HALL AND ISAAC PIERCE, OF HOLLAND PATENT, NEW YORK.

IMPROVEMENT IN MACHINES FOR LOADING HAY.

Specification forming part of Letters Patent No. 43,307, dated June 28, 1864.

*To all whom it may concern:*

Be it known that we, JAMES T. HALL and ISAAC PIERCE, of Holland Patent, county of Oneida, State of New York, have invented a new and useful Improvement in Machines for Elevating Hay and Grain from the Field into a Wagon or other Vehicle; and we do hereby declare that the following is a full and exact description thereof, reference being had to the accompanying drawing, and to the letters of reference marked thereon.

We construct said machine as follows: The frame A is made of wood or other suitable material, and rests on wheels B and B' by wrists X and X', on each of which are, between frame A and wheel B, cog and ratchet wheels, made fast together but turning loose on said wrists X and X', and connected to wheels B and B' by dog Y. Wheels V and V' mesh into pinions W and W' on shaft H. Shaft H has its bearings on uprights D and D', which are attached to frame A. On shaft H are two wheels, J and J', over which pass chains K and K', with projections on surface to mesh into links of chains K and K', said chains passing over wheels L and L' on shaft Z. Said shaft Z has its bearings N and N' attached to standards D and D'. Said bearings can be raised and lowered to tighten said chain K' as required. To standards D and D' are attached bars F and F', which support cross-bar G. On chains K and K' are attached any suitable number of hinged bars, I, I', I'', I''', I'''', and I'''''. The one side of the hinged bar is secured to the chain, while the other can open and shut as required. The loose side has attached to it tines P P'', &c., and is held in position by dog S. Dog S being operated by spring T, hinged bar I falls into a position bringing tines P P''', &c., nearly at right angles with chains K and K', remaining in said position while passing under the bottom of wheels J and J' and up to a point nearly opposite shaft Z, when dog S strikes against the roller M on shaft Z, and is thus pressed back, liberating tines P P'', &c., allowing them to fall back and deliver their load, remaining in said position while passing over the top, when they again resume their former position.

R and R' is an apron for the purpose of keeping the hay or grain from slipping off the tines P P'', &c., before arriving at the proper point. Said apron is supported by bars G, attached to standards D and D', and also to bars F and F'. O O' O'', &c., are clearing-rods, one end of which attached to bar G, passing down between the hinged bars and apron and under the said bars at the bottom, and attached to frame A. Said rods are for the purpose of keeping the hay or grain from getting entangled in the machine, and also for clearing the tines at the proper point. C is a rod to which power is attached for the purpose of operating the machine, the whole being arranged and operated substantially as shown and described.

What we claim as our invention, and desire to secure by Letters Patent, is—

1. The hinged bars I, constructed as described, and provided with the tines T, in combination with the spring-dog S, arranged and operating as and for the purpose shown and described.

2. The clearing-rods O, arranged as shown and described, and operating in combination with the hay-elevating devices, in the manner and for the purpose specified.

JAMES T. HALL.
ISAAC PIERCE.

Witnesses:
WM. DENT,
ROBT. DENT.